United States Patent
Dounaevski et al.

(10) Patent No.: US 7,904,932 B2
(45) Date of Patent: Mar. 8, 2011

(54) WIDEBAND NODE IN A CATV NETWORK

(75) Inventors: Oleg Dounaevski, Netanya (IL); Hillel Weinstein, Haifa (IL); Yeshayahu Strull, Tel Aviv (IL)

(73) Assignee: XTEND Networks Ltd., Tel-Aviv (IL)

( * ) Notice: Subject to any disclaimer, the term of this patent is extended or adjusted under 35 U.S.C. 154(b) by 0 days.

(21) Appl. No.: 12/166,972

(22) Filed: Jul. 2, 2008

(65) Prior Publication Data

US 2009/0119735 A1    May 7, 2009

Related U.S. Application Data

(63) Continuation of application No. 10/869,578, filed on Jun. 16, 2004, now abandoned.

(51) Int. Cl.
*H04N 7/173* (2006.01)
*H04N 7/16* (2006.01)

(52) U.S. Cl. ............ 725/127; 725/149; 370/497

(58) Field of Classification Search .......... 725/127, 725/129
See application file for complete search history.

(56) References Cited

U.S. PATENT DOCUMENTS

| | | |
|---|---|---|
| 3,491,199 A | 1/1970 | Weinstein et al. |
| 4,245,245 A | 1/1981 | Matsumoto et al. |
| 4,506,387 A | 3/1985 | Walter |
| 4,553,161 A | 11/1985 | Citta |
| 4,641,363 A | 2/1987 | Hasegawa |
| 4,970,722 A | 11/1990 | Preschutti |
| 5,058,198 A | 10/1991 | Rocci et al. |
| 5,109,286 A | 4/1992 | West et al. |
| 5,130,664 A | 7/1992 | Pavlic et al. |
| 5,194,947 A | 3/1993 | Lowcock et al. |
| 5,218,714 A | 6/1993 | Ishibashi et al. |
| 5,301,245 A | 4/1994 | Endoh |
| 5,481,757 A | 1/1996 | Mihara et al. |
| 5,499,047 A | 3/1996 | Terry et al. |
| 5,532,733 A | 7/1996 | Wignot |
| 5,587,734 A | 12/1996 | Lauder et al. |
| 5,600,573 A | 2/1997 | Hendricks et al. |

(Continued)

FOREIGN PATENT DOCUMENTS

EP    0 577 351    1/1994

(Continued)

OTHER PUBLICATIONS

European Search Report of Application No. EP 04 25 3439 issued on Nov. 9, 2004.

(Continued)

*Primary Examiner* — Brian T Pendleton
*Assistant Examiner* — Pinkal R Chokshi
(74) *Attorney, Agent, or Firm* — Pearl Cohen Zedek Latzer, LLP

(57) ABSTRACT

A novel node device enables transmission of a wideband signal, in compliance with various acceptable transmission standards and protocols. The signal consists of the legacy spectrum of about 5-860 MHz as well as a new downstream spectrum of about 1000-2000 MHz and a new upstream spectrum of about 2000-3000 MHz or about 930-1100 MHz. The novel device enables transfer of additional data in the upstream direction employing multiple upstream bands without making substantial investment in upstream physical node splitting thus providing networking services to residential subscribers, as well as to small and medium-sized businesses (SMB), which may operate under existing DOCSIS protocols and controlled by standard DOCSIS routers (CMTSs).

31 Claims, 9 Drawing Sheets

U.S. PATENT DOCUMENTS

| | | | |
|---|---|---|---|
| 5,701,152 A | 12/1997 | Chen | |
| 5,708,961 A | 1/1998 | Hylton et al. | |
| 5,724,646 A | 3/1998 | Ganek et al. | |
| 5,768,682 A | 6/1998 | Peyrovian | |
| 5,774,458 A * | 6/1998 | Williamson | 370/276 |
| 5,790,202 A | 8/1998 | Kummer et al. | |
| 5,790,806 A | 8/1998 | Koperda | |
| 5,805,804 A | 9/1998 | Laursen et al. | |
| 5,815,146 A | 9/1998 | Youden et al. | |
| 5,819,036 A | 10/1998 | Adams et al. | |
| 5,822,677 A * | 10/1998 | Peyrovian | 725/126 |
| 5,826,167 A | 10/1998 | Jelinek et al. | |
| 5,881,362 A | 3/1999 | Eldering et al. | |
| 5,961,603 A | 10/1999 | Yardley et al. | |
| 5,963,844 A * | 10/1999 | Dail | 725/125 |
| 5,999,970 A | 12/1999 | Krisbergh et al. | |
| 6,014,457 A | 1/2000 | Caporizzo et al. | |
| 6,049,539 A | 4/2000 | Lee et al. | |
| 6,134,419 A | 10/2000 | Williams | |
| 6,199,207 B1 | 3/2001 | Jelinek et al. | |
| 6,253,375 B1 | 6/2001 | Gordon et al. | |
| 6,348,837 B1 | 2/2002 | Ibelings | |
| 6,381,745 B1 | 4/2002 | Paul | |
| 6,393,607 B1 | 5/2002 | Hughes et al. | |
| 6,462,923 B1 | 10/2002 | Vokey | |
| 6,481,013 B1 | 11/2002 | Dinwiddie et al. | |
| 6,487,391 B1 | 11/2002 | Park | |
| 6,523,177 B1 * | 2/2003 | Brown | 725/121 |
| 6,536,042 B1 | 3/2003 | Paul | |
| 6,577,414 B1 | 6/2003 | Feldman et al. | |
| 6,581,208 B1 * | 6/2003 | Inaguma | 725/149 |
| 6,615,407 B1 | 9/2003 | Inaguma | |
| 6,785,907 B1 | 8/2004 | Dan et al. | |
| 6,941,576 B2 | 9/2005 | Amit | |
| 7,072,360 B2 * | 7/2006 | Dravida et al. | 370/468 |
| 7,146,630 B2 * | 12/2006 | Dravida et al. | 725/111 |
| 7,209,497 B2 * | 4/2007 | Weinstein et al. | 370/535 |
| 7,313,130 B2 * | 12/2007 | Redfern | 370/352 |
| 2002/0078464 A1 * | 6/2002 | Dravida et al. | 725/105 |
| 2003/0066088 A1 | 4/2003 | Jung | |
| 2004/0172658 A1 | 9/2004 | Rakib et al. | |
| 2004/0268402 A1 | 12/2004 | Bugajski et al. | |
| 2005/0114903 A1 * | 5/2005 | Ahmed et al. | 725/114 |

FOREIGN PATENT DOCUMENTS

| | | |
|---|---|---|
| EP | A-0 589 531 | 3/1994 |
| EP | 0 695 092 | 1/1996 |
| EP | 0 742 658 | 11/1996 |
| EP | 963 116 | 12/1999 |
| JP | 04-196792 | 7/1992 |
| JP | 9-162818 | 6/1997 |
| JP | 11-041213 | 2/1999 |
| WO | WO 96/08925 | 3/1996 |
| WO | WO 99/14953 | 3/1999 |
| WO | WO 99/16201 | 4/1999 |
| WO | WO 01/22364 | 3/2001 |
| WO | WO 01/41890 | 6/2001 |
| WO | WO 01/60066 | 8/2001 |
| WO | WO 02/33968 | 4/2002 |
| WO | WO/02/33969 | 4/2002 |
| WO | WO 03-049225 | 6/2003 |

OTHER PUBLICATIONS

Anonymous: "XHUB Specification" Internet Article, Jan. 30, 2003, pp. 1-2, XP002304701, Retrieved from the Internet: URL: http://web.archive.org/web/20021203122347/www.xtendnetworks.com/productsXHUB. htm> [retrieved on Nov. 8, 2004].

Anonymous: "XHUB Master Module Block Diagram" Internet Article, Jan. 30, 2003, pp. 1-1, XP002304702, Retrieved from the Internet: URL: http://web.archive.org/web/20021218154059/www.xtendnetworks.com/productsXhubDiag.htm> [retrieved on Nov. 8, 2004].

Anonymous: "XHUB 3004 Specification" Internet Article, Jan. 27, 2004, pp. 1-2, XP002304703, Retrieved from the Internet: URL: http://web.archive.org/web/20040202203319/www.xtendnetworks.com/productsXHUB.htm> [retrieved on Nov. 8, 2004].

Anonymous: "XHUB Master Module Block Diagram" Internet Article, Jan. 27, 2004, pp. 1-1, XP002304704, Retrieved from the Internet: URL: http://web.archive.org/web/20040203035218/www.xtendnetworks.com/productsXhubDiag.htm> [retrieved on Nov. 8, 2004].

Anonymous: "Xtending Cable Bandwith- an Alternative to Node Splitting" Internet Article, Oct. 1, 2001, XP002202041.

Electroline Electronic Equipment, Inc. "Increasing Subscribers & Improving Profitability with Addressable Taps - a White Paper," Nov. 1999; (http://www.electroline.com/en/products/white_papers/tech2/tech2.html).

"Video-on-Demand Overview", INTERNET, www.cs.tut.fi/tlt/stuff/vodOverview/vod1, Jari Peltoniemi, Jan. 30, 1995.

"SeaChange Offers New Breakthrough Video Server Capabilities for Video-on-Demand," Sea-Change-News INTERNET, www.seachangeinternational.com/2000/pr255.html, Jul. 11, 2001.

"Multimedia Traffic Engineering for HFC Networks: A White Paper on Data, Voice and Video Over IP", 1999, Cisco Systems, Jan. 1, 1999.

Motorola Product Details, Advanced Media Technologies, Internet pages printed Jul. 28, 2004 from http://www.dxcomm.com/products/Motorola.

"RF Transformer DL 3, 6 Splitter B78408-A1226—A3," Aug. 6, 2002, printed from http://www.epcos.com/inf/85/ds/b78408a1226a3.pdf, on Jul. 28, 2004.

"Modern Cable Television Technology, Video, Voice, and data Communications," Ciciora, W. et al, Morgan Kaufmann Publishers, Inc.; Chapters 9, 10, 13, and 14, 1999.

"Electronics Engineers Handbook $4^{th}$ Edition" Christiansen, D. (Ed. ), McGraw Hill ISBN 0-07-021077-2, 1997.

Pages from Internet URLs: http://www.eccentrix.com, http://www.divx-digest.com, http://www.ultimateresourcesite.com, http://www.cnet.co, printed Jul. 29, 2004.

"Interactive Digital Video Networks: Lessons from a Commercial Deployment," Rath, K. et al., IEEE Communication Magazine, vol. 35(6) pp. 70-74, XP000659191, ISSN: 0163-6804; Jun. 1997.

"Multiplexing DBS and CATV over a Common Coaxial Distribution Plant" Schliserman, A., Xtend Networks Ltd., XP002202040, Sep. 5, 2001; retrieved from http://www.xtendnetworks.com/images/xtend2.pdf, on Jun. 13, 2002.

"Xtending Cable Bandwith—An Alternative to Node Splitting" Xtend Networks Ltd., XP002202041, Oct. 1, 2001; retrieved from http://www.xtendnetworks.com/images/xtend/pdf.

Diva Web Site Overview and DIVA Navigator, printed from Diva website URLS: http://www.divatv.com/HTML_mirror/products/prod_overview.html, www.divatv.com/php/prod_link.php3, www.divatv.corn/HTML_mirror/services/serv_navigator.html, www.divatv.com/php/prod_server.html, on Jul. 29, 2004.

"Personal Video Recorder (PVR) Meets Video-on-Demand (VOD)" First presented at the Society of Cable Telecommunicaiton Engineers (SCTE) 2001 Conference on Emerging Technologies by Robert Chism, Vice President, Development, Concurrent Computer Corporation, Sep. 17, 2001.

"Reality Check for Video-on-Demand," The Economist print edition, Jun. 21, 2001, printed from http://www.economist.com/science/tq/displaystory.cfm?story_ID=662210 on Jan. 29, 2009.

"Texans Get An Early Taste of Video-on-Demand," Time Warner Cable of Austin, SeaChange-Broadband Case Study, printed Jul. 28, 2004.

* cited by examiner

WIDEBAND NODE IN A CATV NETWORK

CROSS REFERENCE TO RELATED APPLICATIONS

The present application is generally related to co-pending PCT application No. PCT/IL00/00655 entitled SYSTEM AND METHOD FOR EXPANDING THE OPERATIONAL BANDWIDTH OF A COMMUNICATION SYSTEM, filed 16 Nov. 2000, which is incorporated herein by reference. The present application is a continuation of U.S. patent application Ser. No. 10/869,578, filed Jun. 16, 2004 now abandoned, which is hereby incorporated in its entirety by reference.

BACKGROUND OF THE INVENTION

1. Field of the Invention

The present invention relates generally to cable television distribution networks. More particularly, the present invention relates to a node in a HFC infrastructure-based CATV network utilized as an advanced interfacing device between the fiber optic segment and the coaxial segment of the CATV infrastructure.

2. Discussion of the Related Art

In CATV distribution networks based on a Hybrid Fiber Coax (HFC) plant infrastructure the fiber optic trunk and the coaxial trunk of the network are connected via specific devices typically referred to as fiber nodes. In the downstream the fiber node receives optical signals from the head-end via fiber optic cables, converting the optical signals to an RF signal and feeding the RF signal to the network subscribers via the coaxial portion which typically includes the distribution and drop cables and associated amplifiers and splitters. In the upstream the fiber node receives an RF signal from subscribers via the coaxial portion of the network, converts the RF signal to optical signals and feeds the optical signals via the fiber optic portion of the network back to the head-end.

Presently signals transmitted across a standard cable television infrastructure, from a head-end to a network subscriber and back from the network subscriber to the head-end, are modulated such as to have a bandwidth with a frequency range of about 5 MHz to about 860 MHz. The signals carry diverse encoded information units representing content, services and applications. Logically related and physically grouped information units are suitably modulated into distinct specifically allocated transmission channels. The channels are distributed across the available frequency range according to a predefined frequency plan. The number of potentially available downstream channels from the head-end to the subscriber and upstream channels from the subscriber to the head-end for the subscribers depends directly on the available bandwidth of the signal. The currently utilized signal with an about 5 to 860 MHz transmission bandwidth limits the number of available downstream and upstream channels. In many applications the 5-42 MHz portion of the signal is used for upstream transmission and the 50-860 MHz portion of the signal is used for the downstream or forward portion.

The Data Over Cable Services Interface Specification (DOCSIS) protocol has proven itself a successful product for broadband Internet access to the residential subscribers. Some Multi-system Operators (MSOs) are beginning to provide DOCSIS to small and medium businesses as a best effort connection for Internet access. However, DOCSIS over existing HFC networks can not be used as an alternative to existing high-speed data services as the existing HFC networks do not have the transmission spectrum to carry the high speed data for the small and medium businesses (SMB), which require substantial data throughput in the upstream as well as in the downstream direction. The transmission spectrum problem is particularly acute in the upstream where out of the about 15 to 42 MHz portion of the signal used less than 20 MHz are usable. In addition, equipment which is based on the DOCSIS standard, such as the so-called CMTS routers, located in the head-end of the HFC networks is now suitable for broadcast and reception of a signal ranging between about 5-860 MHz.

The current solution for increasing the upstream capacity, which is referred to as node splitting, involves costly investment as well as only 80 MHz of the 100 MHz available since some of the spectrum is dedicated to common service for all nodes. The co-pending related PCT patent application PCT/IL00/00655 describes and teaches a system and method of a CATV network having a bandwidth of about 5 to about 3000 MHz for the transmission of upstream and downstream wideband signals within. The CATV network could be a standard coaxial media-based plant or an HFC-infrastructure. The system and method proposed by the above-mentioned related patent application involves the installation and/or modification of a set of active and passive components along the signal transport path of the network in order to enable the transmission of a wideband signal with a frequency range of about 5 to 3000 MHz and higher.

It is however desirable to continue use of the equipment presently operative in the head-end of the CATV network, such as but not limited to DOCSIS CMTS routers, while providing a bandwidth in excess of 860 MHz. It is also desirable to make use of the DOCSIS protocol for transfer of data in the upstream direction employing multiple upstream bands without making substantial investment in upstream physical node splitting thus providing networking services to subscribers, small and medium-sized businesses.

SUMMARY OF THE PRESENT INVENTION

Currently operating CATV systems are inherently asymmetric as constrains and limitations exist regarding the size and speed of the upstream traffic. The asymmetry arises as a result of a limited upstream frequency band of about 5 to 42 MHz. It is an objective of the present invention to alleviate the problem of asymmetry by providing additional upstream frequency bands and by delivering additional high-speed channels within the additional frequency band, as well as additional downstream channels.

One aspect of the present invention regards a hybrid fiber cable signal distribution network, a node apparatus for the division, frequency conversion and multiplexing of at least four signal sub-bands included in a high frequency band signal of a wideband signal of about 5 to 3000 MHz. The apparatus comprises the elements of: a triplexer device to separate in an upstream direction the wideband signal into the high frequency band signal and a CATV signal of about 5 to 860 MHz, an amplifier device to amplify the high frequency band signal in the upstream direction, a splitter device to split the amplified high frequency band signal into at least four reproduced signals in the upstream direction, a first frequency converter device to down-convert the first frequency sub-band of the first reproduced signal into a first down-converted signal of about 12 to 42 MHz in the upstream direction, a second frequency converter device to down-convert the second frequency sub-band of the second reproduced signal into a second down-converted signal in the upstream direction, a third frequency converter device to down-convert the third frequency sub-band of the third reproduced signal into a third down-converted signal in the upstream direction, a fourth frequency converter device to down-convert the fourth frequency sub-band of the fourth reproduced signal into a fourth down-converted signal in the upstream direction; and a multiplexer device to multiplex the first down-converted signal, the second down-converted signal, the third down-converted signal and the fourth down-converted signal into a combined signal in the upstream direction.

A second aspect of the present invention regards within a hybrid fiber cable signal distribution network, a method for the division, frequency conversion and multiplexing of at least four signal sub-bands included in a high frequency upstream band signal of a combined wideband signal of about 5 to 3000 MHz. The method comprises the steps of: separating in an upstream direction the wideband signal into the high frequency band signal and a CATV signal of about 50 to 860 MHz, amplifying the high frequency band signal in the upstream direction, splitting the amplified high frequency band signal into at least four reproduced signals in the upstream direction, down-converting the first frequency sub-band of the first reproduced signal into a first down-converted signal in the upstream direction, down-converting the second frequency sub-band of the second reproduced signal into a second down-converted signal in the upstream direction, down-converting the third frequency sub-band of the third reproduced signal into a third down-converted signal in the upstream direction, down-converting the fourth frequency sub-band of the fourth reproduced signal into a fourth down-converted signal in the upstream direction; and multiplexing the first down-converted signal, the second down-converted signal, the third down-converted signal and the fourth down-converted signal into a combined signal in the upstream direction.

According to the teachings of the present invention, existing CATV data protocols and standards, such as DOCSIS, and their associated routers, such as the so-called CMTS, can be readily used, thus utilizing and preserving the investments made by various MSOs.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

A new and novel node device is disclosed which enables transmission of a wideband signal consisting of the legacy spectrum of about 5-860 MHz as well as a new downstream spectrum of about 1000-2000 MHz and a new upstream spectrum of about 2000-3000 MHz which enables transfer of data in the upstream direction employing multiple upstream bands without making substantial investment in upstream physical node splitting thus providing networking services to residential subscribers, as well as to small and medium-sized businesses (SMB).

Figure 1:
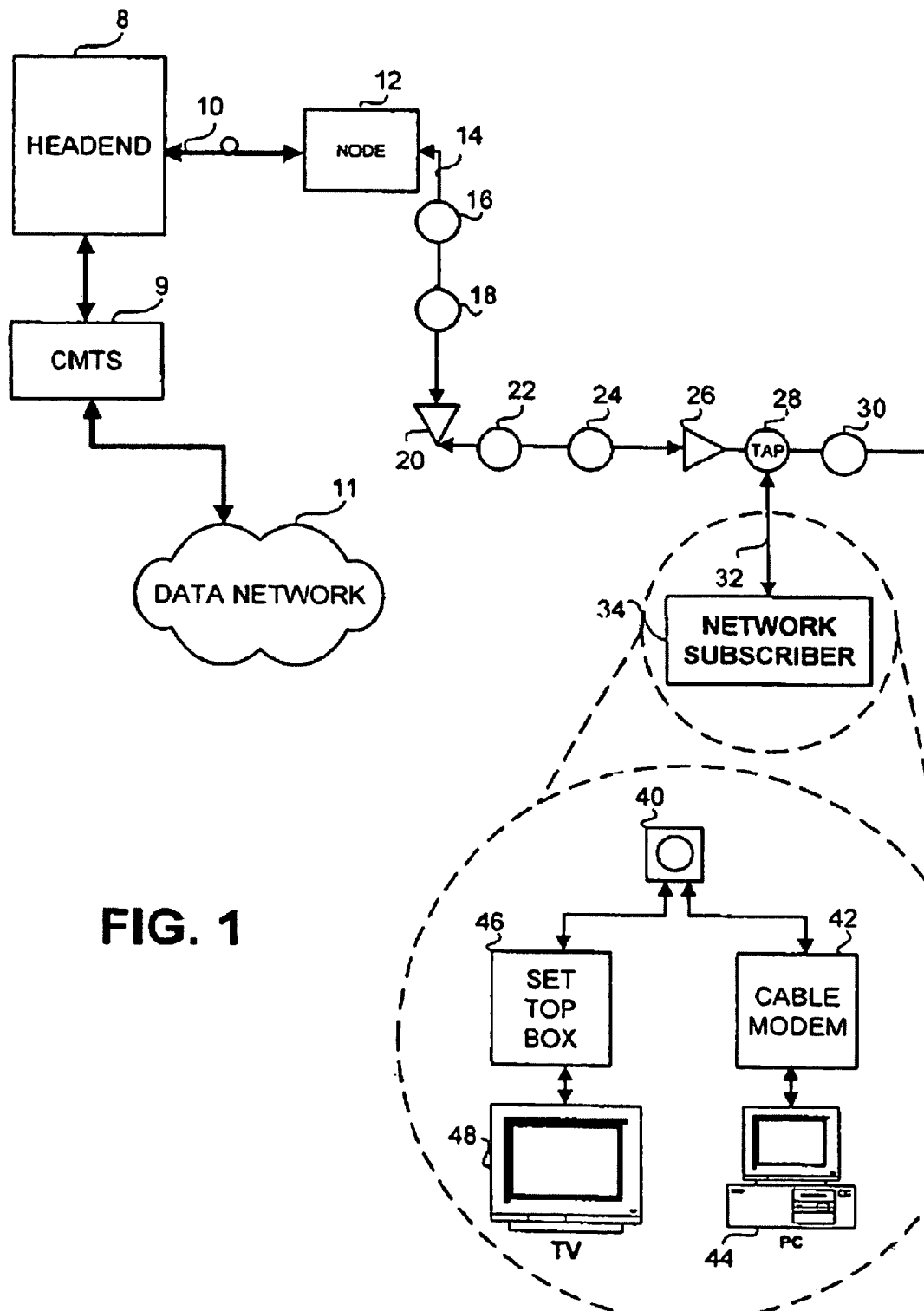
FIG. 1 is a schematic illustration of a CATV distribution plant, as known in the art.

FIG. 1 illustrates a simplified structure of an existing CATV network. Signals from a network head-end 8 are transmitted and received via the fiber trunk section 10 of the network to a conventional CATV node device 12. The head-end may include one or more DOCSIS or other Cable Modem Termination System (CMTS) devices 9. The CATV node device 12 is connected to network subscribers 32 via one or more ports where each port connected to a distinct distribution coax cable 14. The distribution cable 14 includes one or more line extender amplifiers (LEX) 20, 26 to maintain the signal levels and several splitters and tap devices 16, 18, 22, 24, 28, 30. The tap devices 28, 30 are linked via specific drop cables 32 to the Customer Premises Equipment (CPE) of the network subscribers 34. At the network subscriber the outlet 40 is connected to a cable modem 42 and a CPE such as a computing device 44 and to Set Top Box 46 connected to CPE such as a television set 48.

The transmission path over the cable system can be realized at the head-end by the CMTS 9 and at each subscriber location by a cable modem (not shown). At the head-end or hub (not shown), the interface to the data-over-cable system is called the Cable Modem Termination System-Network-Side Interface (CMTS-NSI), which may be specified in DOCSIS protocol. At the subscriber locations, the interface is called the cable-modem-to-customer-premises-equipment interface (CMCI) and may also be specified in DOCSIS protocol.

Operators desire to transparently transfer data between these interfaces. The CMTS 9 may be connected to a data network 11, such as the Internet or other wide or local networks. Presently at the head-end 8 the CMTS 9 receives data from the data network 11. The data is modulated by the CMTS 9 to the CMTS downstream RF interface (not shown) and is combined and sent downstream in the 50-860 MHz signal band. In the upstream direction, data is sent from the node 12 via the fiber trunk cable to the head-end 8 in the 5-42 MHz signal band. The CMTS upstream RF interface (not shown) receives the data signal from the upstream splitter (not shown) and demodulates the signal to data signals sent to the data network 11. The CATV node device 12 converts the fiber optic signal into an RF signal to be transmitted downstream on the distribution coax cable 14.

The DOCSIS defines the interface requirements for cable modems operative in high-speed data distribution over cable television system networks. The current DOCSIS protocol enables the handling of data transmission in the downstream direction at speeds up to about 30 Mbps per 6 MHz channel at quadrature amplitude modulation (QAM) 64, as well as up to about 10 Mbps per 3.2 MHz channel at QAM 16 for the upstream or return direction. The node 12 is the frequency conversion element, which may be implemented by having a multi port hub to interface with a multi port fiber node. However, the current upstream data speeds are much lower, due to the inherent asymmetry of the cable network spectrum. The apparatus and method proposed by the present invention provide substantially higher upstream data speeds in order to alleviate the problem.

In accordance with the present invention the downstream signal of between about 100-800 MHz is converted to a first high frequency signal of about 1250-1950 MHz band. The fiber node of the present invention further receives the upstream signal carried in a second high frequency signal band of about 2250-2950 MHz band. In the preferred embodiment of the present invention, the first and second high frequency signal bands are divided into channels carrying data according to the DOCSIS protocol which can provide up to 100 new 6 MHz channels each carrying 30 Mbps with QAM 64 metrics in the downstream direction, and 100 new 3.2 MHz channels each carrying 10 Mbps with QAM 16 metrics in the upstream direction. The creation of these additional upstream channels, according to the teachings of this invention, enables the transmission of substantially more high-speed data to and from the subscribers and particularly in the upstream direction. Because DOCSIS is a Layer 2 protocol Virtual Private Networks may be implemented in association with the present invention in order to replace costly leased line services.

Figure 2A:
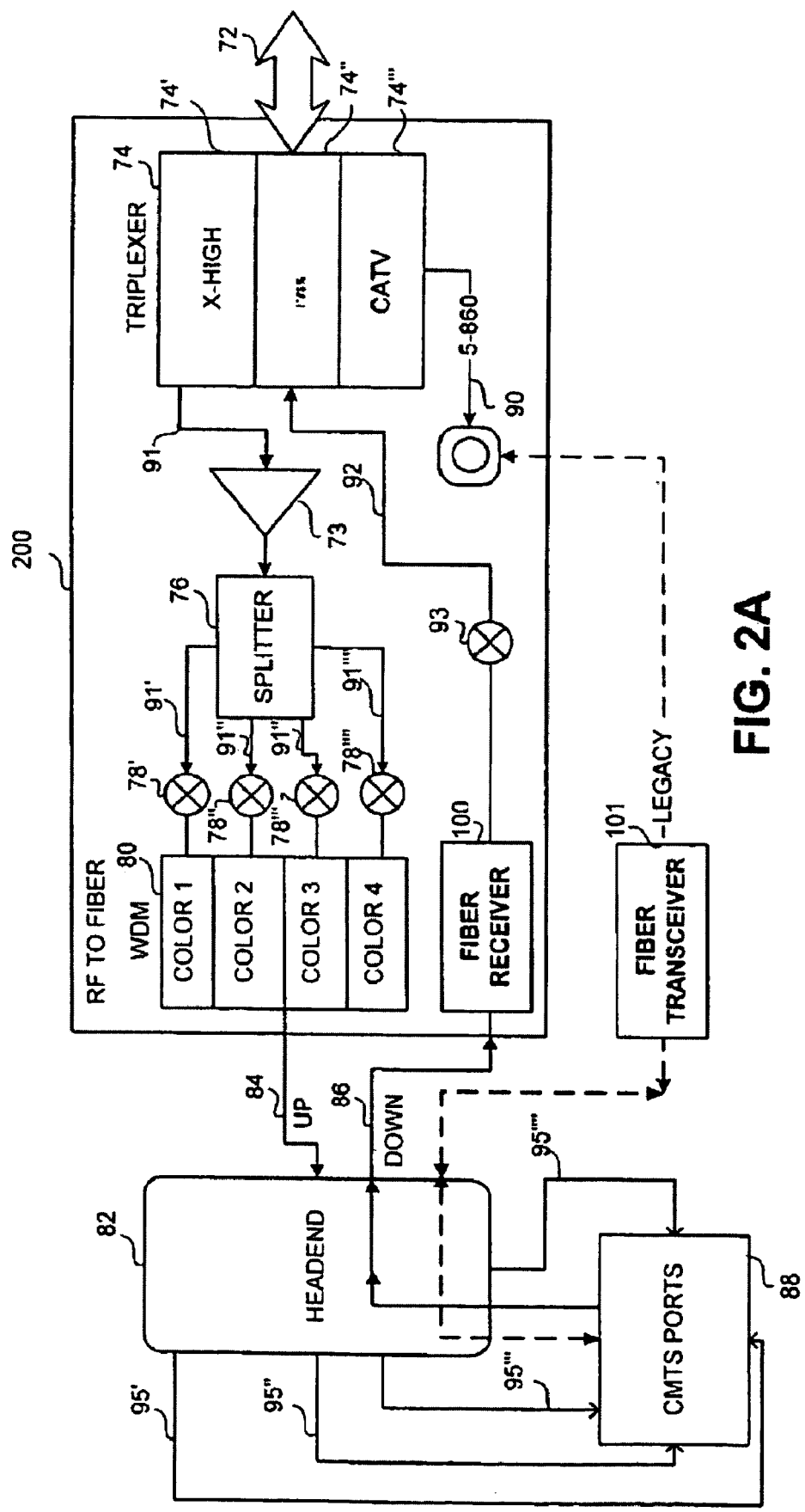
FIG. 2A is a schematic illustration of the structure of the wideband node device installed in the CATV network, in accordance with a preferred embodiment of the present invention.

Referring now to FIG. 2A where the node device 200 of the present invention is installed in an HFC infrastructure-based CATV network between the fiber trunk and the distribution cable of the network. The node device 200 is connected to at least one distribution line in the downstream and to a fiber node (not shown) in the upstream where the fiber node is connected via the fiber optic lines 84, 86 to a network head-end 82. The device 200 comprises a triplexer device 74, an amplifier device 73, a signal splitter device 76, at least four frequency conversion devices 78', 78", 78''', 78'''', and a Wavelength Division Multiplexing (WDM) multiplexer device 80.

In FIG. 2A the device 74 receives an upstream wideband signal 72 of about 5 to about 3000 MHz from the distribution segment of the CATV network. A node may receive one or more downstream wideband signal from one or more distribution cables. Typically a node will receive 3 distribution cables in the upstream direction. The wideband signal 72 is fed to the triplexer device 74. The triplexer device 74 comprises three frequency selective circuits in order to select from the wideband signal 72 three separate frequency bands. The CATV frequency selective circuit 74''' separates the signal 90 of about 5 to about 860 MHz band from the wideband signal. The signal 90 carries the standard CATV channels in the downstream and upstream from the network head-end 82 through the fiber node to the network subscribers and vice versa. A fiber transceiver 101 converts the RF signal to optic signal in the upstream direction and from the fiber optic to RF signal in the downstream or forward direction.

In the upstream direction, the X-High frequency selective circuit 74' separates from the wideband signal 72 a high frequency signal 91 of about 2250 to 3000 MHz band of the wideband signal 72. The separated high frequency signal 91 carries upstream data submitted by the network subscribers in order to be sent to the head-end 82 via an upstream fiber optic trunk 84. In the example of the present embodiment the high frequency signal 91 may be divided into about 100 3.2 MHz channels each carrying DOCSIS compliant data at about 10 Mbps in the upstream direction. The signal 91 includes at least four frequency sub-bands in between 2250 and 3000 MHz where each sub-band carries 30 MHz of upstream band. The four sub-bands may be collected from one to four different distribution lines. In one example, the signal 91 includes a first sub-band of an about 2250 to about 2280 MHz frequency range that carries upstream data, a second sub-band of an about 2300 to about 2330 MHz frequency range that carries upstream data, a third sub-band of about 2350 to about 2380 MHz that carries upstream data, and a fourth sub-band of about 2400 to about 2430 MHz that carries upstream data. The first, second, third and fourth sub-bands may be received from one to four different distribution lines.

Note should be taken that the limiting values of the above described sub-band limits could be different. Other sub bands could be selected for operation and additional nodes of the present invention may be cascaded in parallel to create additional upstream channels. In one example 8 or even 16 upstream channels can be maintained in accordance with the teaching of the present invention. Each sub band may comprise of 9 channels of about 3.2 MHz or 18 channels of about 1.6 MHz carrying data at 10 Mbps and 5 Mbps respectively. Consequent to the separation the signal 91 is fed to the amplifier device 73 and amplified in order to maintain appropriate signal level. Subsequently the amplified signal 91 is fed to a signal splitter device 76. The splitter device 76 splits the signal 91 into at least four identical or near identical reproduced signals 91', 91", 91''', and 91''''. The reproduced signals 91', 91", 91''', 91'''' are fed into a set of frequency selective block conversion devices 78', 78", 78''', 78'''' respectively. In the example of the present invention, the first reproduced signal 91' is down-converted by the frequency conversion device 78' from the about 2250 to 2280 MHz to about 12-42 MHz. The second reproduced signal 91" is down-converted by the frequency conversion device 78" from the about 2300 to 2330 MHz to about 12-42 MHz. The third reproduced signal 91''' is down-converted by the frequency conversion device 78''' from the about 2350 to 2380 MHz to about 12-42 MHz. The fourth reproduced signal 91'''' is down-converted by the frequency conversion device 78'''' from the about 2400 to 2430 MHz to about 12 to 42 MHz. The output of the frequency conversion devices the first down-converted signal 78', the second down-converted signal 78", the third down-converted signal 78''', and the fourth down-converted signal 78'''' are four distinct signals at the about 12 to 42 MHz frequency band where each distinct signal carries sub-band and or distribution line-specific upstream data.

Subsequently the signals are either converted into optical format by an RF-to-Optical converter (not shown) or converted into digital format by an Analog-to-Digital converter device (not shown). The converted signals are fed to a multiplexer device 80. The device 80 could be a Wavelength Division Multiplexing (WDM or DWDM) device or any other multiplexer device in accordance with the network configuration. The multiplexer device 80 generates a multiplexed output signal 84 that is transmitted across the trunk segment of the CATV network to the network head-end 82 via an optical transmitter device. The multiplexed signal 84 is received by the network head-end 82. The signal is separated into at least four distinct signals 95', 95", 95''', 95'''' and the separated signals are transmitted to separate CMTS ports in order to be suitably handled by the CMTS device 88.

Figure 2B:
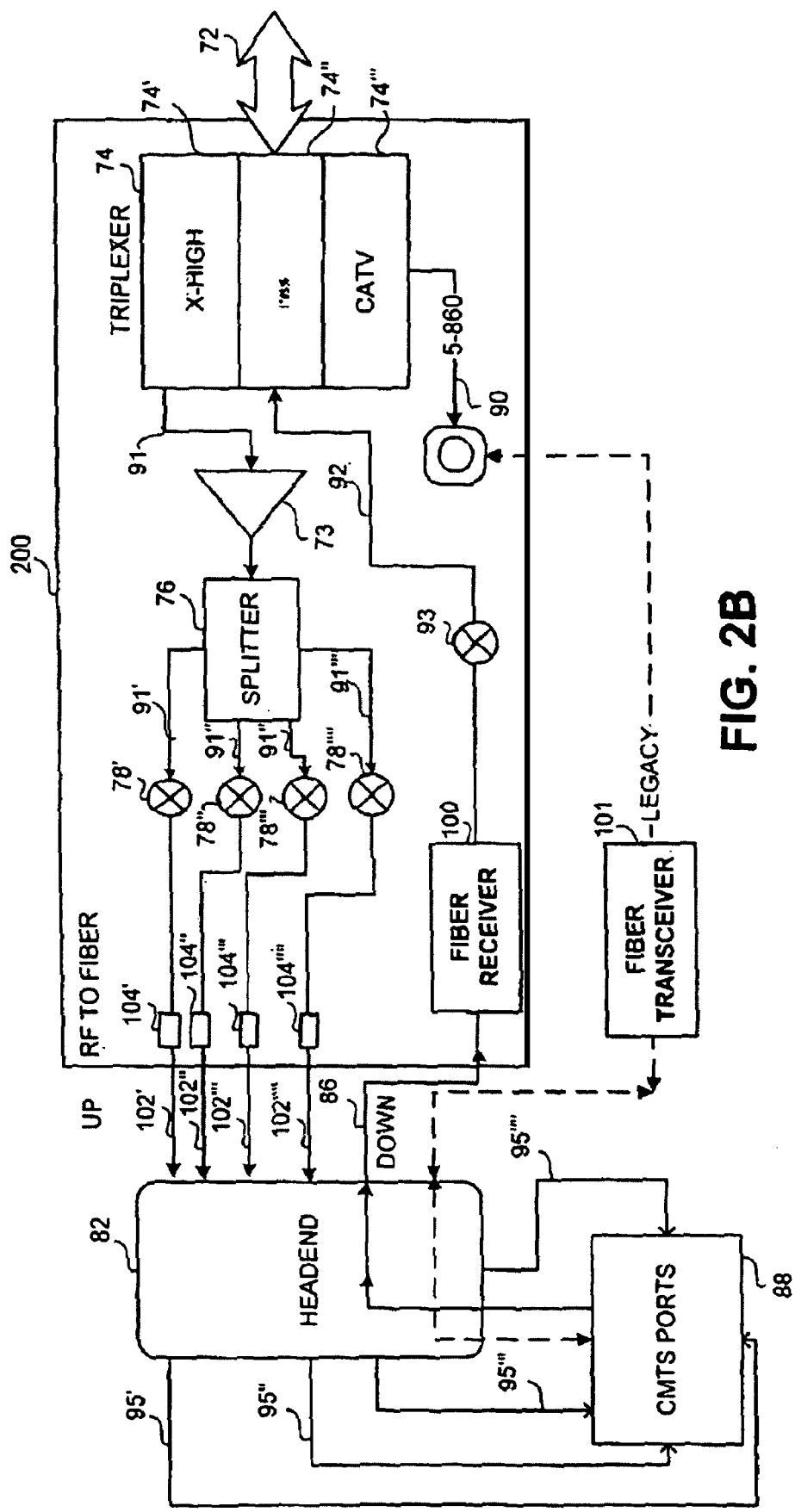
FIG. 2B is a schematic illustration of the structure of an alternative extended node device, in accordance with a preferred embodiment of the present invention.

As shown in FIG. 2B, instead of multiplexing the down-converted signals into a combined signal, the at least four down-converted signals could be converted to optical format by RF-to-Optical converters 104', 104", 104''', 104'''' and fed into at least four separate fiber optic lines 102', 102", 102''', 102'''' that could carry the at least four signals separately to the network head-end 82 via the fiber trunk segment of the CATV network. The four optical signals transmitted through the optical fibers 102', 102", 102''', 102'''' are received by the network head-end 82 and are transmitted to separate CMTS ports in order to be suitably handled by the CMTS device 88.

In the downstream a signal carrying data generated through CMTS ports 88 of about 100 to about 800 MHz is transmitted from the head-end 82 to the extended node device 72 via the fiber trunk segment 86 of the CATV network. This signal is non-legacy and includes new data and information. In accordance with the configuration of the network the signal 86 is suitably converted from optical format to RF analog format via a fiber receiver 100. The signal 86 is then up-converted by the frequency conversion device 93 to signal 92 from the about 150-860 MHz to the about 1250-1950 MHz signal band. The X-low frequency selective circuit 74" combines the low frequency signal 92 of about 1250 MHz to about 1950 MHz to the wideband signal 72. The signal 92 carries a plurality of additional channels in the downstream from the network head-end 82 to network subscribers. In the example of the present embodiment the low frequency signal 92 may be divided into about 100 6 MHz channels each carrying DOCSIS compliant data at about 30 Mbps per channel in the downstream or forward direction. The triplexer device 74 combines the signal 92 with the CATV signal legacy signal 90 into a wideband signal that is transmitted to the distribution lines in the downstream or forward direction.

Figure 3:
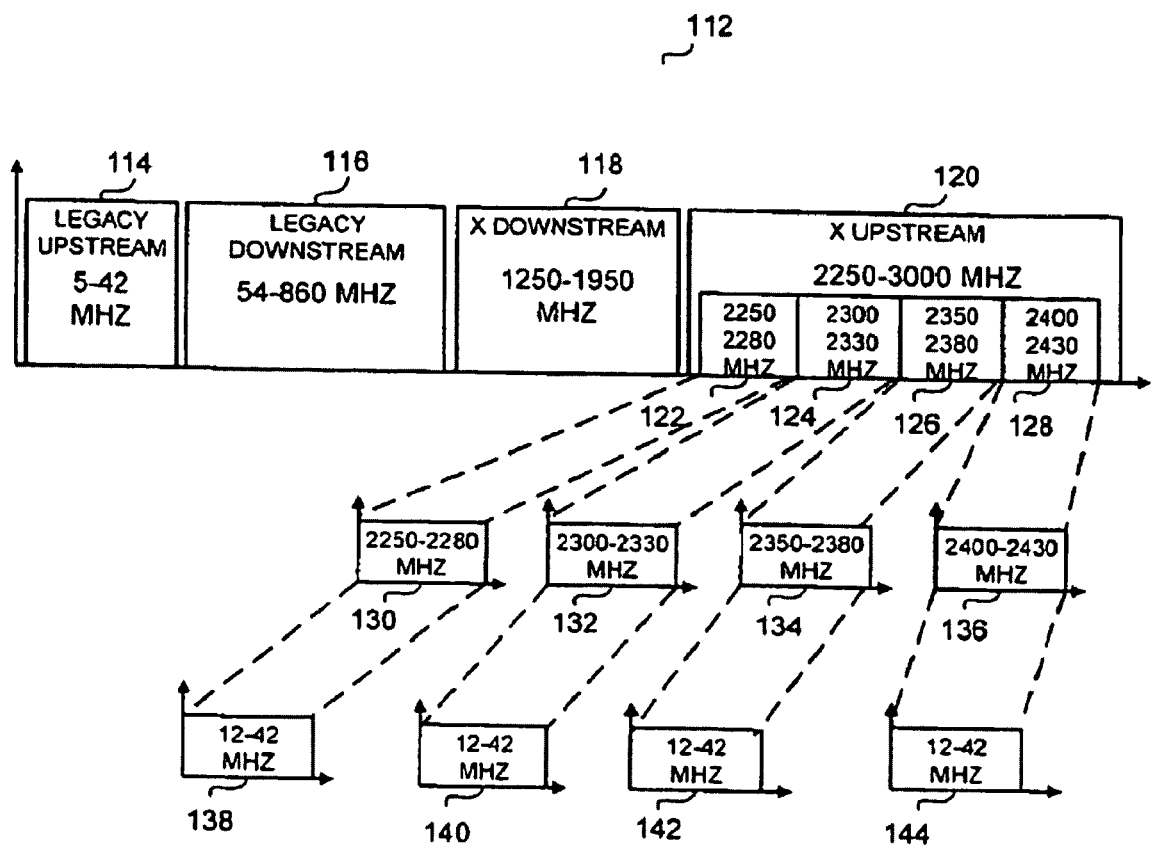
FIG. 3 shows an exemplary allocation of the transmission spectrum of the wideband signal in the upstream and downstream, in accordance with a preferred embodiment of the present invention.

Referring now to FIG. 3 the transmission spectrum spans a frequency range of about 5 to 3000 MHz. The spectrum includes an about 5 to 42 MHz legacy upstream band 114, an about 54 to 880 MHz legacy downstream band 116, an about 1250 to 1950 MHz additional (or extended) downstream band 118, and an about 2250 to 3000 MHz additional upstream region 120. The legacy region spans a frequency range of about 5 to 860 MHz. The legacy upstream band 114 is allocated within the legacy region and carries information units introduced by the network subscribers from the subscribers to the head-end in the upstream. The legacy downstream band 116 is allocated within the legacy region and it is utilized to transmit legacy channels from the head-end to the network subscribers in the downstream. The additional bandwidth region spans a frequency range of about 1250 to 3000 MHz. The additional downstream band 118 is allocated within the additional frequency region, said band is used in the transmission of a plurality of channels from the head-end to the subscribers in the downstream. The additional upstream band 120 is allocated to carry information units generated by the subscribers from the subscribers to the head-end in the upstream.

In the preferred embodiment of the invention, the upstream band 120 is divided into at least four sub-bands 122, 124, 126, and 128 where each sub-band spans a frequency rage of about 30 MHz. The frequency allocation of the sub-bands is as follows: an about 2250 to 2280 MHz sub-band 122, an about 2300 to 2330 MHz sub-band 124, an about 2350 to 2380 MHz sub-band 126, and an about 2400 to 2430 MHz sub-band 128. Each of the sub-bands 122, 124, 126, 128 include about 10 upstream channels assigned for subscriber traffic under the current DOCSIS protocols. The bandwidth of each of the upstream channels is about 3 MHz.

As described above the four sub-bands may be collected from one to four different distribution lines. The wideband node extracts the four sub-bands 122, 124, 126, 128 from the additional upstream band 120. From the extracted sub-bands 122, 124, 126, 128 four separate signals, such as an about 2250 to 2280 MHz signal 130, about 2300 to 2330 MHz signal 132, an about 2350 to 3280 MHz signal 134, and an about 2400 to 2430 MHz signal 136, are created. The signals 130, 132, 134, 136 each has a 30 MHz bandwidth. Consequently the four signals 130, 132, 134, 136 are down-converted separately to four signals 138, 140, 142, 144 where each of the down-converted signals have the same about 30 MHz bandwidth and the same about 12 to 42 MHz frequency range but carrying different content.

Figure 4:
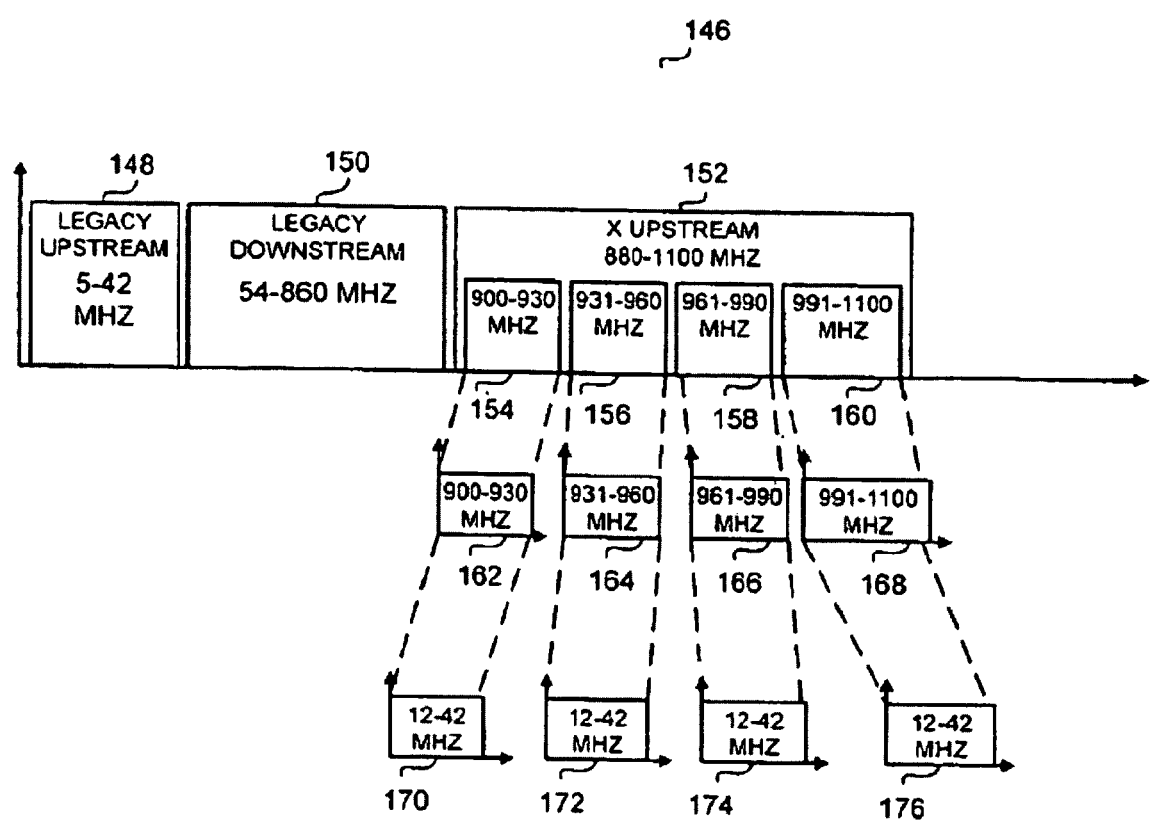
FIG. 4 shows another exemplary allocation of the transmission spectrum of the wideband signal in the upstream and downstream, in accordance with a preferred embodiment of the present invention.

Referring now to FIG. 4 the wideband node proposed by the present invention can be modified to allow substantially increased upstream data transmission without the need to replace passive elements in upgraded legacy CATV networks if the spectrum used will be confined up to about 1100 MHz. In the proposed wideband node of FIG. 3 provision is made for about four upstream channels in the 2250 to 3000 MHz frequency range. The above mentioned frequency allocation will require the replacement of existing CATV passive elements. In order to prevent the necessity of replacing the passives, a frequency range of about 860 MHz to 1100 MHz could be dedicated to the additional upstream data traffic. Still referring to FIG. 4 the transmission spectrum includes an about 5 to 42 MHz legacy upstream band 148, an about 54 to 880 MHz legacy downstream band 150, and an about 880 to 1100 MHz additional upstream region. The additional upstream band 152 is allocated to carry information units generated by the subscribers from the subscribers to the head-end in the upstream.

In the preferred embodiment of the invention, the upstream band 152 is divided into at least four sub-bands 154, 156, 158, and 160 where each sub-band spans a frequency rage of about 30 MHz. The frequency allocation of the sub-bands is as follows: an about 900 to 930 MHz sub-band 154, an about 931 960 MHz sub-band 156, an about 961 to 990 MHz sub-band 158, and an about 991 to 1100 MHz sub-band 160. Each of the sub-bands 154, 156, 158, 160 include about 10 upstream channels assigned for subscriber traffic. The bandwidth of each of the upstream channels is about 3 MHz, all operating under DOCSIS protocols.

As described above the four sub-bands may be collected from one to four different distribution lines. The wideband node extracts the four sub-bands 154, 156, 158, 160 from the additional upstream band 120. From the extracted sub-bands 154, 156, 158, 160 four separate signals, such as an about 900 to 930 MHz signal 162, about 931 to 960 MHz signal 164, an about 961 to 990 MHz signal 166, and an about 991 to 1100 MHz signal 168 are created. The signals 162, 164, 166, 168 each has a 30 MHz bandwidth. Consequently the at least four signals 162, 164, 166, 168 are down-converted separately to four signals 170, 172, 174, 176 where each of the down-converted signals have the same about 30 MHz bandwidth and the same about 12 to 42 MHz frequency range.

Figure 5A:
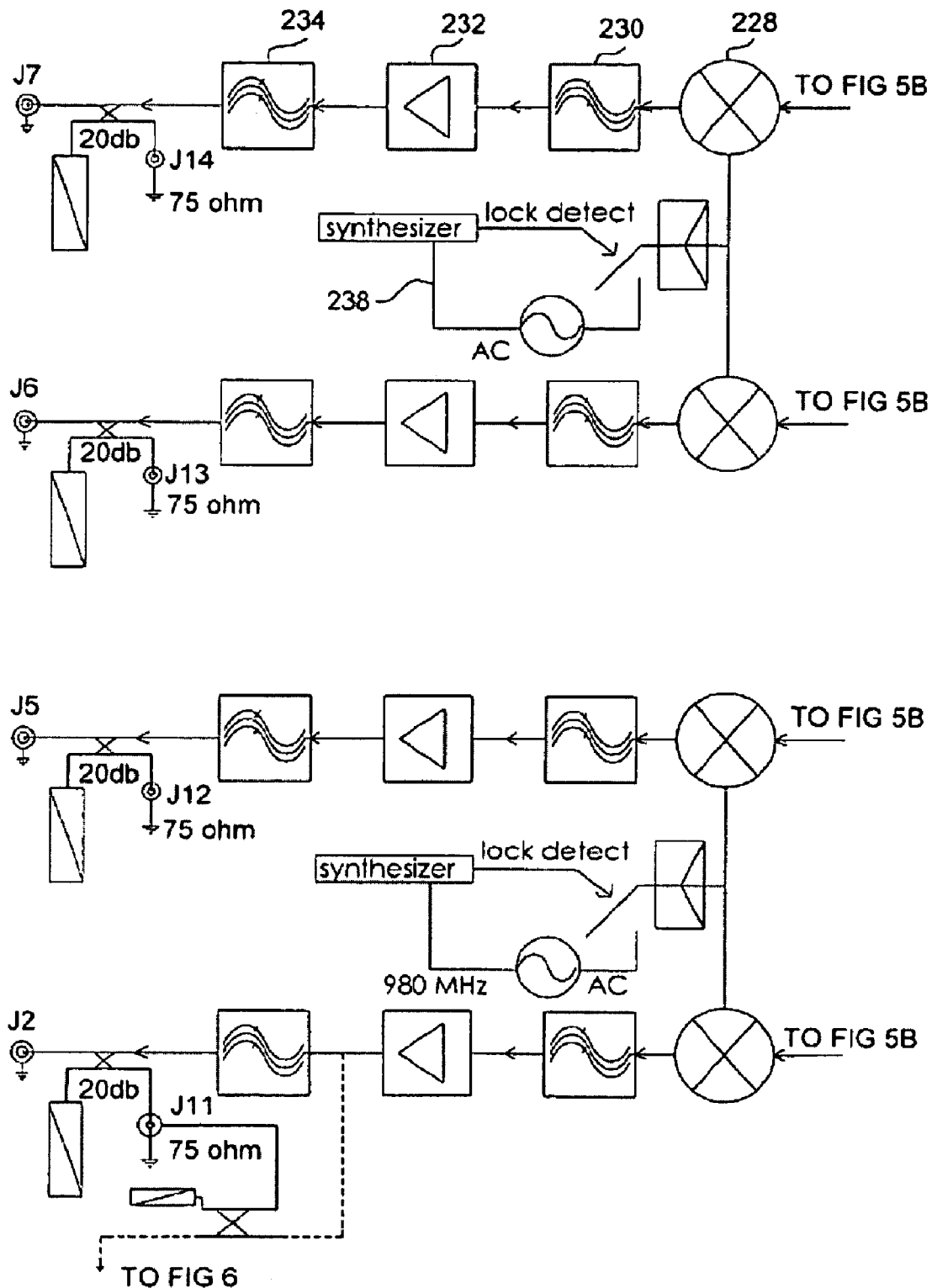
FIGS. 5A, 5B, 6A and 6B show the detailed exemplary structure of the wideband node device installed in the CATV network, in accordance with a preferred embodiment of the present invention.
Figure 5B:
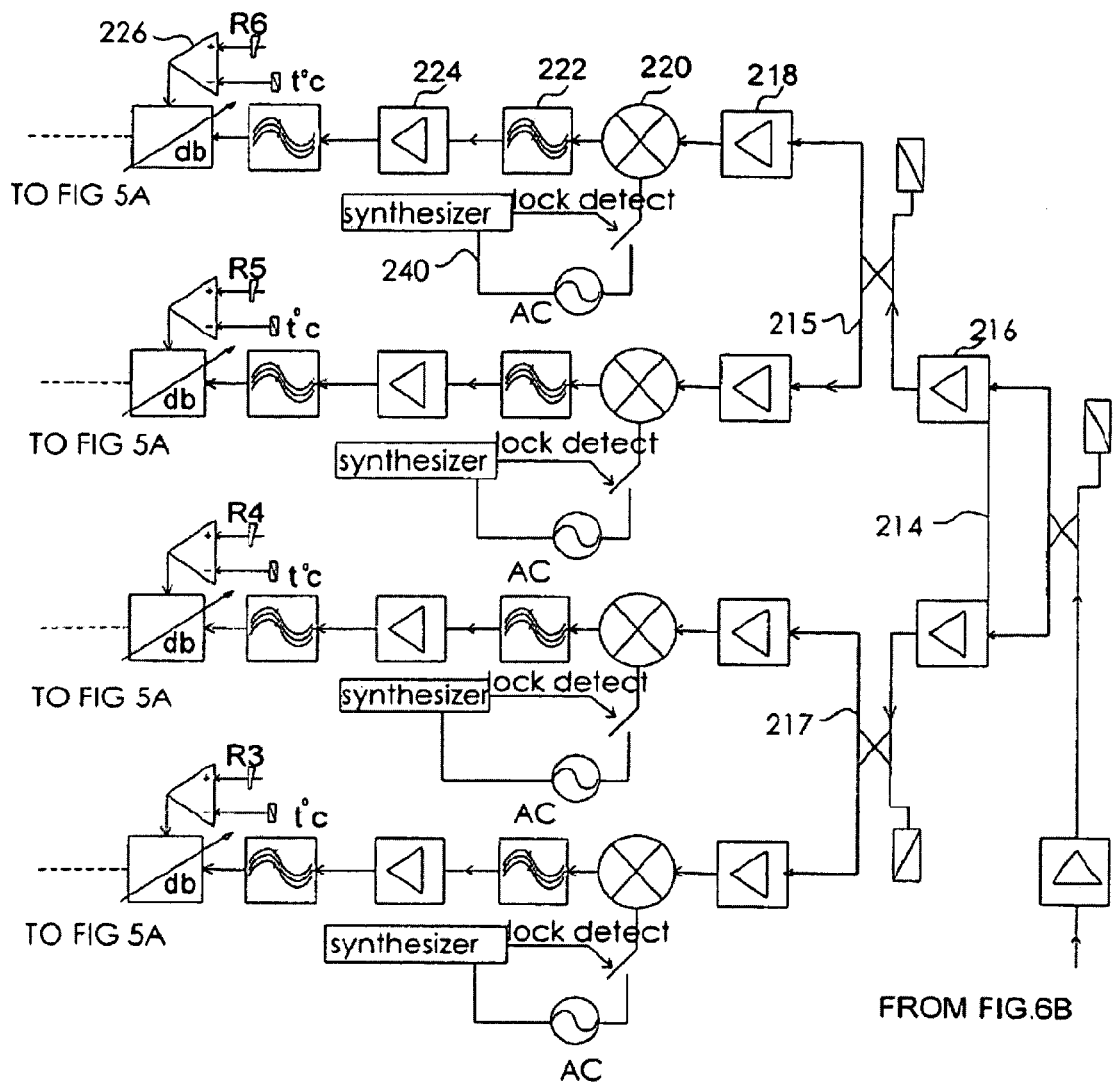
Figure 6A:
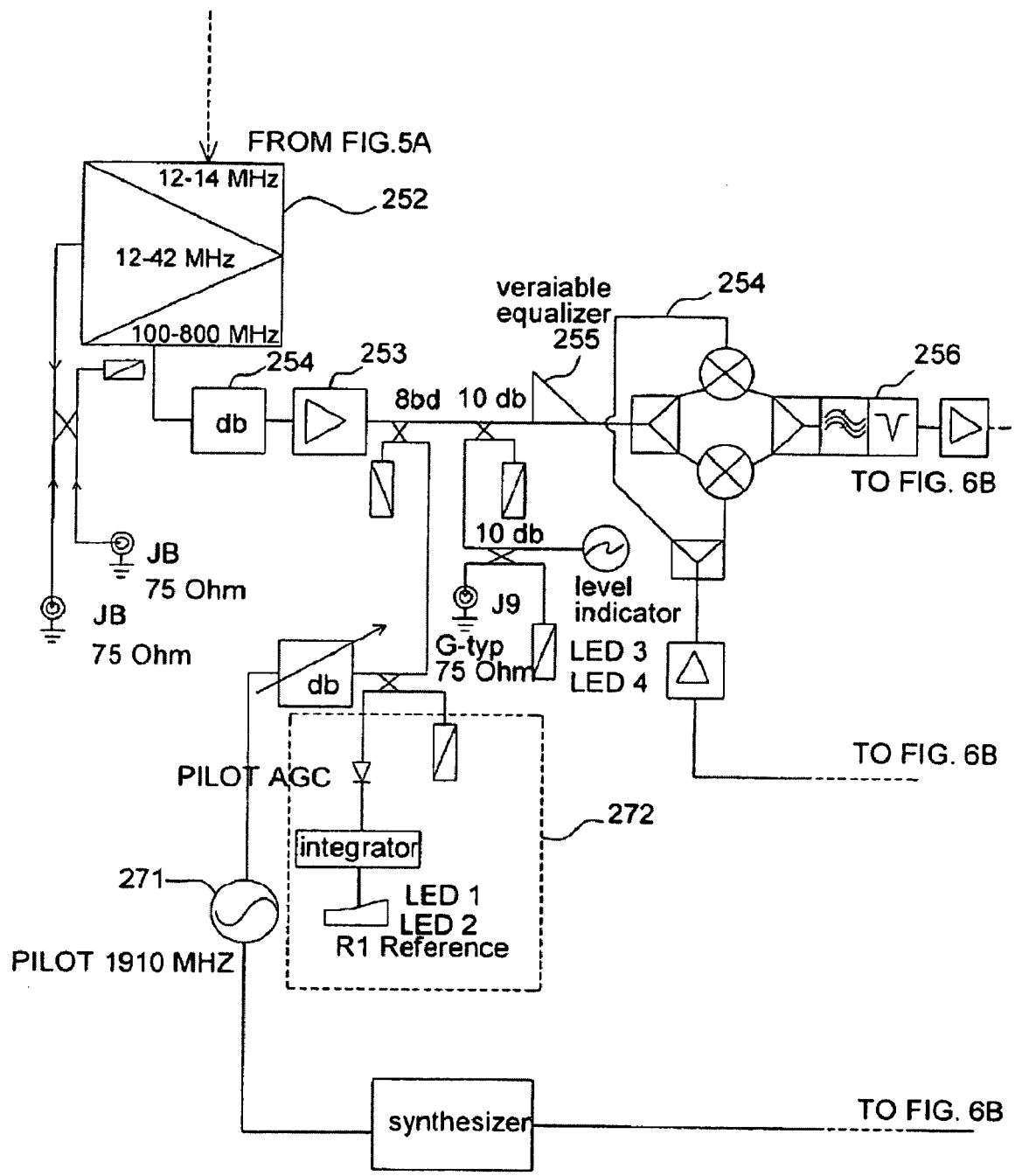
Figure 6B:
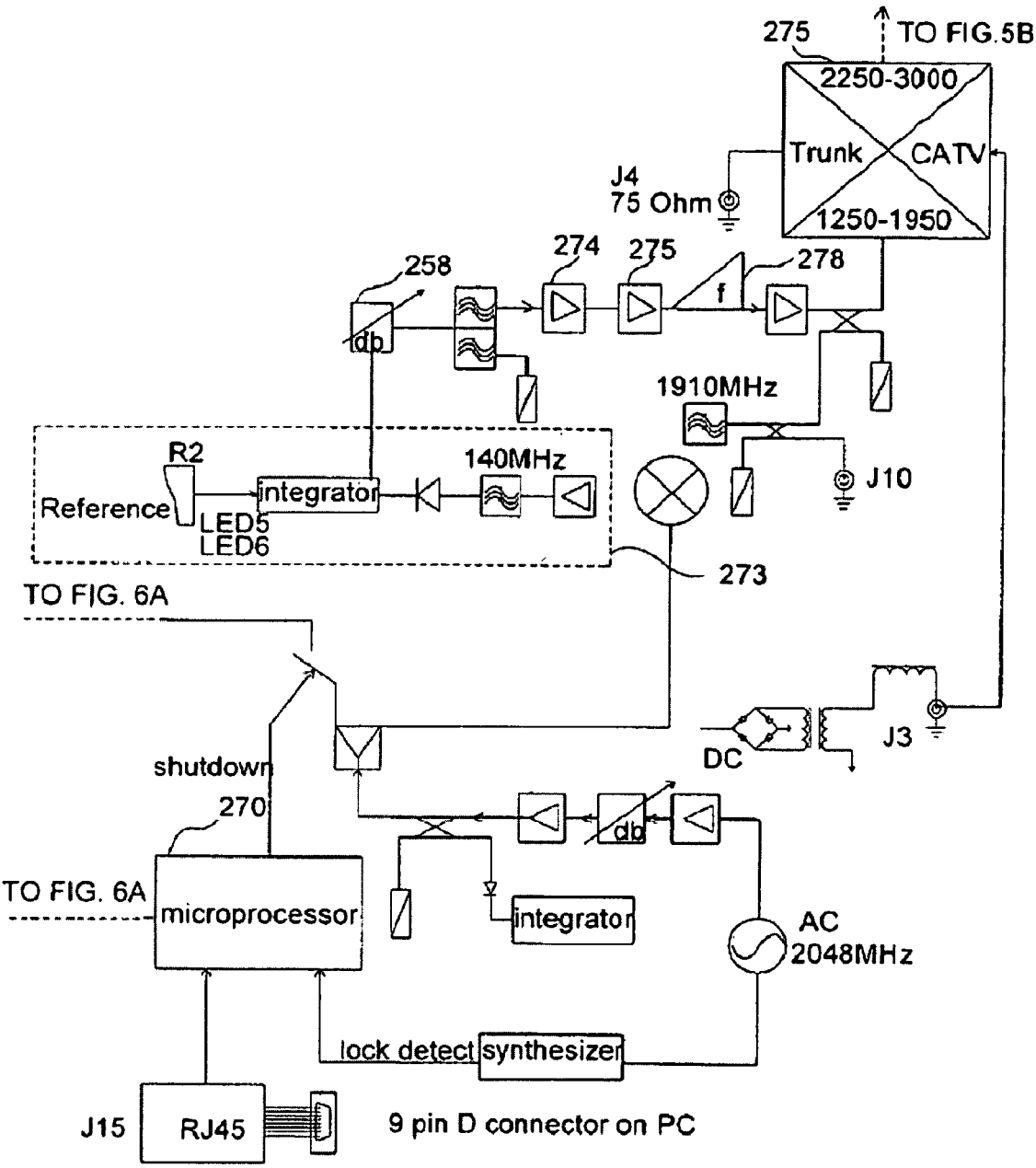

The operating procedures and associated components of the wideband node device were described herein above in association with FIGS. 2A and 2B. An exemplary detailed structure of the wideband node device and the components is shown in FIGS. 5A, 5B, 6A and 6B. In general, FIGS. 5A and 5B show the components for the handling of the signals with an allocated frequency band of about 2250 to 3000 MHz in the upstream, while in general FIGS. 6A and 6B shows the components used in the handling of the signals with a frequency band of about 1250 to 1950 MHz in the downstream. Several values concerning the limits of various frequency ranges are different from the values provided herein above. In other preferred embodiments of the invention still more different values could be used as it was amply demonstrated in the relevant value differences between FIGS. 2A and 2B.

The wideband signal of about 5 to 3000 MHz is fed from the network subscribers to the head-end in the upstream. As shown in FIGS. 6A and 6B the wideband signal is received via a connection point J4 and fed into a triplexer device 212. The device 212 divides the signal into three distinct bands; a legacy (CATV) frequency band of about 5 to 860 MHz, a downstream frequency band of about 1250 to 1950 MHz, and an upstream frequency band of about 2250 to 3000 MHz. The upstream band of about 2250 to 3000 MHz is fed through amplifiers, and split in two stages by splitter devices 214, 215, 217 into four identical signals having a frequency bandwidth of about 2250 to 3000 MHz. As was described in association with FIGS. 2A and 2B each of the identical signals are processed separately by distinct groups of components. The groups of components are represented on FIGS. 5A and 5B by electrical symbols successively located in four processing sections leading to the connection points J7, J6, J5, and J2, respectively. Each of the component groups extract of a specific sub-band from the original wideband signal, in the conversion of the extracted specific sub-band into a different frequency band and in the down-converting of the frequency band into a pre-defined lower frequency band. Since the principles of the operation were already described in association with FIGS. 2A and 2B and since the components associated with the processing sections illustrated are substantially similar only the operation of one processing section will be described. Other sections operate in a similar manner.

The signal that is fed through the component group that is suitably arranged in the processing section leading to connection point J7 is converted from a frequency band of about 2250 to 2280 MHz to a first IF of about 700 MHz to 900 MHz by a mixer 20 in association with a PLL 240. Consequently, the signal is filtered by filter 222, amplified by amplifier 224 and attenuated by variable attenuator 226. The signal is down-converted by mixer 228 controlled by PLL 238 to a frequency range of about 12 to 42 MHz. Then, the signal is fed through the connection point J7 via several filtering devices 230, 234, and an amplifier device 232. The three other signals pass through three similar processing sections leading respectively to connection points J6, J5, and J2. From the connection points. J7, J6, J5, and J2 the four separate signals having the same frequency band of about 12 to 42 MHz are fed to the head-end through the optical trunk segment of the network. As described in FIGS. 2A and 2B the four signals are either multiplexed by a WDM device or converted separately into optical format by a RF-to-Optical converter sent to the head-end via four separate optical fiber lines.

The legacy (CATV) frequency band of the signal is sent from the triplexer 212 to the head-end via connection point J3. The downstream frequency band of the signal is fed from the head-end to connection point J1 to a diplexer 252. The diplexer 252 separates the about 100 to 800 MHz frequency band and feds the separated portion of the signal to the triplexer 212 device via a downstream processing section. The downstream processing section up-converts the about 100 to 800 MHz frequency band into an about 1250 to 1950 MHz band. The signal is passed through an amplifier 253, a variable equalizer 255 and a mixer unit 254. The mixer unit 254 up-converts the signal in accordance with conversion values supplied by a pre-programmed microprocessor 270. A pilot signal of 1910 MHz (271) controlled by a pilot control AGC circuit 272 is inserted into the signal in order to maintain signal coherence. The up-converted downstream signal is passed through a filtering device 256, an attenuator device controlled by an AGC circuit 273, several amplifier devices 274, 275, a tilt up equalizer device 278 and fed into the triplexer device 212. The triplexer device 212 combines the legacy band, the downstream band and the upstream band to a wideband signal having a frequency range of about 5 to 3000 MHz and feeds the wideband signal downstream through the distribution segment of the network to the network subscribers.

Note should be taken that the operational values illustrated in the discussed drawings are in accordance with a preferred embodiment of the present invention. In other embodiments different values could be used. Furthermore, the details of the implementation could differ among different embodiments.

As a result of the operation of the wideband node device, the low frequency signal carries data in the downstream direction and the high frequency carries data in the upstream direction utilizing an additional bandwidth of above 1 GHz and up to about 3 GHz while presently currently used head-end equipment and the DOCSIS protocol is fully exploited to carry up to about 9 channels of 3.2 MHz per channel 10 Mbps at data streams in the upstream direction.

Moreover, the multiple upstream signals transmitted over the high frequency range enable to render a DOCSIS system in the SMB market, as well as for other markets requiring symmetric data transfers into a high-throughput system in the upstream as well as the downstream direction.

Persons skilled in the art will appreciate that the low and high frequency signal band assignments may be altered and that various other signal bands may be used in association with the teaching of the present invention. It will be appreciated by persons skilled in the art that the present invention is not limited to what has been particularly shown and described hereinabove. Rather the scope of the present invention is defined only by the claims, which follow.

We claim:

1. In a hybrid fiber cable signal distribution network, a node apparatus for the division, frequency conversion and multiplexing of at least four signal sub-bands included in a high frequency band signal of a wideband signal of about 5 to 3000 MHz, said wideband signal received in the upstream direction from a distribution segment of a CATV network, the apparatus comprising the elements of:

a triplexer device to separate in an upstream direction the wideband signal into the high frequency band signal and a CATV signal of about 5 to 860 MHz, wherein said high frequency band signal includes at least four frequency sub-bands, each frequency sub-band carry respective upstream data;

an amplifier device to amplify the high frequency band signal in the upstream direction;

a splitter device to split the amplified high frequency band signal into at least four reproduced signals in the upstream direction, each reproduced signal in the respective frequency sub-band of said high frequency band signal;

a first frequency converter device to down-convert the first frequency sub-band of the first reproduced signal into a first down-converted signal of about 12 to 42 MHz in the upstream direction;

a second frequency converter device to down-convert the second frequency sub-band of the second reproduced signal into a second down-converted signal in the upstream direction;

a third frequency converter device to down-convert the third frequency sub-band of the third reproduced signal into a third down-converted signal in the upstream direction;

a fourth frequency converter device to down-convert the fourth frequency sub-band of the fourth reproduced signal into a fourth down-converted signal in the upstream direction, wherein each of said first down-converted signal, second down-converted signal, third down-converted signal and fourth down-converted signal has substantially the same bandwidth and substantially the same frequency range as the other down-converted signals, and wherein each of said down-converted signals carries the respective upstream data of the respective frequency sub-band from which said down-converted signal was down-converted; and a multiplexer device to multiplex the first down-converted signal, the second down-converted signal, the third down-converted signal and the fourth down-converted signal into a combined signal in the upstream direction.

2. The node apparatus as claimed in claim 1 wherein the high frequency upstream band signal is of about 2000 to 3000 MHz.

3. The node apparatus as claimed in claim 1 wherein the high frequency upstream band signal is of about 860 to 1100 MHz.

4. The node apparatus as claimed in claim 2 wherein the high frequency band signal further comprises a plurality of channels, which may be operating under the DOCSIS standards and protocols.

5. The node apparatus as claimed in claim 3 wherein the high frequency band signal further comprises a plurality of channels, which may be operating under the DOCSIS standards and protocols.

6. The node apparatus as claimed in claim 1 wherein the first or second or third or fourth frequency sub bands are about 30 MHz wide, which may be operating under the DOCSIS standards and protocols.

7. The node apparatus as claimed in claim 1 wherein the first frequency sub-band is in the about 2250 to 2280 MHz or in the about 900 to 930 MHz frequency range.

8. The node apparatus as claimed in claim 1 wherein the second frequency sub-band is in the about 2300 to 2330 MHz or in the about 931 to 960 MHz frequency range.

9. The node apparatus as claimed in claim 1 wherein the third frequency sub-band is in the about 2350 to 2380 MHz or in the about 961 to 990 MHz frequency range.

10. The node apparatus as claimed in claim 1 wherein the fourth frequency sub-band is in the about 2400 to 24300 MHz or in the about 991 to 1100 MHz frequency range.

11. The node apparatus as claimed in claim 1 wherein the first or second or third or fourth down-converted signal is in the about 12 to 42 MHz.

12. The node apparatus as claimed in claim 1 further comprises an RF-to-optical converter in the upstream direction and an Optical-to-RF converter in the downstream direction.

13. The node apparatus as claimed in claim 1 further comprises an optical transmitter device in the upstream and an optical receiver in the downstream direction.

14. The node apparatus as claimed in claim 1 wherein the triplexer device combines into the wideband signal a low frequency signal.

15. The node apparatus as claimed in claim 1 further comprises a fifth frequency converter device to up-convert a downstream signal to a low frequency band signal in a downstream direction.

16. The node apparatus as claimed in claim 15 wherein the low frequency downstream band signal is in the about 1000 to 2000 MHz.

17. The node apparatus as claimed in claim 15 wherein the downstream signal is in the about 150-860 MHz.

18. In a hybrid fiber cable signal distribution network, a method for the division, frequency conversion and multiplexing of at least four signal sub-bands included in a high frequency upstream band signal of a wideband signal of about 5 to 3000 MHz, said wideband signal received in the upstream direction from a distribution segment of a CATV network, the method comprising the steps of separating in an upstream direction the wideband signal into the high frequency band signal and a CATV signal of about 50 to 860 MHz, wherein said high frequency band signal includes at least four frequency sub-bands, each frequency sub-band carry respective upstream data; amplifying the high frequency band signal in the upstream direction; splitting the amplified high frequency band signal into at least four reproduced signals in the upstream direction, each reproduced signal in the respective frequency sub-band of said high frequency band signal; down-converting the first frequency sub-band of the first reproduced signal into a first down-converted signal in the upstream direction; down-converting the second frequency sub-band of the second reproduced signal into a second down-converted signal in the upstream direction; down-converting the third frequency sub-band of the third reproduced signal into a third down-converted signal in the upstream direction; down-converting the fourth frequency sub-band of the fourth reproduced signal into a fourth down-converted signal in the upstream direction, wherein each of said first down-converted signal, second down-converted signal, third down-converted signal and fourth down-converted signal has substantially the same bandwidth and substantially the same frequency range as the other down-converted signals, and wherein each of said down-converted signals carries the respective upstream data of the respective frequency sub-band from which said down-converted signal was down-converted; and multiplexing the first down-converted signal, the second down-converted signal, the third down-converted signal and the fourth down-converted signal into a combined signal in the upstream direction.

19. The method as claimed in claim 18 wherein the high frequency band signal is of about 2000 to 3000 MHz.

20. The method as claimed in claim 18 wherein the first frequency sub-band is in the about 2250 to 2280 MHz or in the about 900 to 931 MHz frequency range.

21. The method as claimed in claim 18 wherein the second frequency sub-band is in the about 2300 to 2330 MHz or in the about 931 to 960 MHz frequency range.

22. The method as claimed in claim 18 wherein the third frequency sub-band is in the about 2350 to 2380 MHz or in the about 961 to 990 MHz frequency range.

23. The method as claimed in claim 18 wherein the fourth frequency sub-band is in the about 2400 to 2430 MHz or in the about 991 to 1100 MHz frequency range.

24. The method as claimed in claim 18 wherein the first or second or third or fourth down-converted signal is in the about 12 to 42 MHz.

25. The method as claimed in claim 18 further comprising the step of combining into the wideband signal a low frequency signal.

26. The method as claimed in claim 18 further comprises the step of up-converting a downstream signal to a low frequency band signal in a downstream direction.

27. The method as claimed in claim 25 wherein the low frequency band signal is in the about 1000 to 2000 MHz.

28. The method as claimed in claim 24 wherein the low frequency band signal is in the about 1000 to 2000 MHz.

29. The method as claimed in claim 25 wherein the low frequency band signal further comprises a plurality of channels.

30. The method as claimed in claim 26 wherein the low frequency band signal further comprises a plurality of channels.

31. The method as claimed in claim 26 wherein the downstream signal is in the about 150-860 MHz.

* * * * *